USO05498012A

United States Patent [19]
McDaniel et al.

[11] Patent Number: 5,498,012
[45] Date of Patent: Mar. 12, 1996

[54] CONVERTIBLE VEHICLE STEP

[75] Inventors: Patrick K. McDaniel; Gale E. McDaniel, both of Richland, Wash.

[73] Assignee: McDaniel Manufacturing, Inc., Richland, Wash.

[21] Appl. No.: 263,926

[22] Filed: Jun. 21, 1994

Related U.S. Application Data

[63] Continuation-in-part of Ser. No. 80,952, Jun. 21, 1993, Pat. No. 5,375,864.

[51] Int. Cl.⁶ .................................................. B60R 3/02
[52] U.S. Cl. .................................................. 280/166; 182/89
[58] Field of Search .............................. 280/166, 164.1, 280/163; 182/89, 91; 105/447

[56] References Cited

U.S. PATENT DOCUMENTS

| 3,751,068 | 8/1973 | Green | 280/166 |
|---|---|---|---|
| 3,758,134 | 9/1973 | Stewart | 280/163 |
| 3,762,742 | 10/1973 | Bucklen | 280/166 |
| 3,980,319 | 9/1976 | Kirkpatrick | 280/166 |
| 4,231,583 | 11/1980 | Learn | 280/166 |
| 5,375,864 | 12/1994 | McDaniel | 280/166 |

FOREIGN PATENT DOCUMENTS

| 63-255144 | 10/1988 | Japan | 280/166 |
|---|---|---|---|
| 4138944 | 5/1992 | Japan | 280/166 |
| 4339040 | 11/1992 | Japan | 280/166 |
| 403594 | 3/1974 | U.S.S.R. | 280/166 |
| 0934387 | 8/1963 | United Kingdom | 280/166 |
| 9204208 | 3/1992 | WIPO | 280/166 |

Primary Examiner—Margaret A. Focarino
Assistant Examiner—Peter C. English
Attorney, Agent, or Firm—Christensen, O'Connor, Johnson & Kindness

[57] ABSTRACT

An extendible and retractable step assembly for mounting on vehicles. The assembly includes a mount which is fixed to either side of the vehicle. An extendible subassembly includes a step mounted on a movable swing arm in a preferred parallelogram linkage. The pivot axes of the arms are inclined causing the step to be moved downward and outward into an extended position. Cable and motor operators are shown to provide automatic operation when the vehicle door is operated. A safety release is used on the cable operator to allow vehicle door operation even if the step assembly becomes jammed.

14 Claims, 13 Drawing Sheets

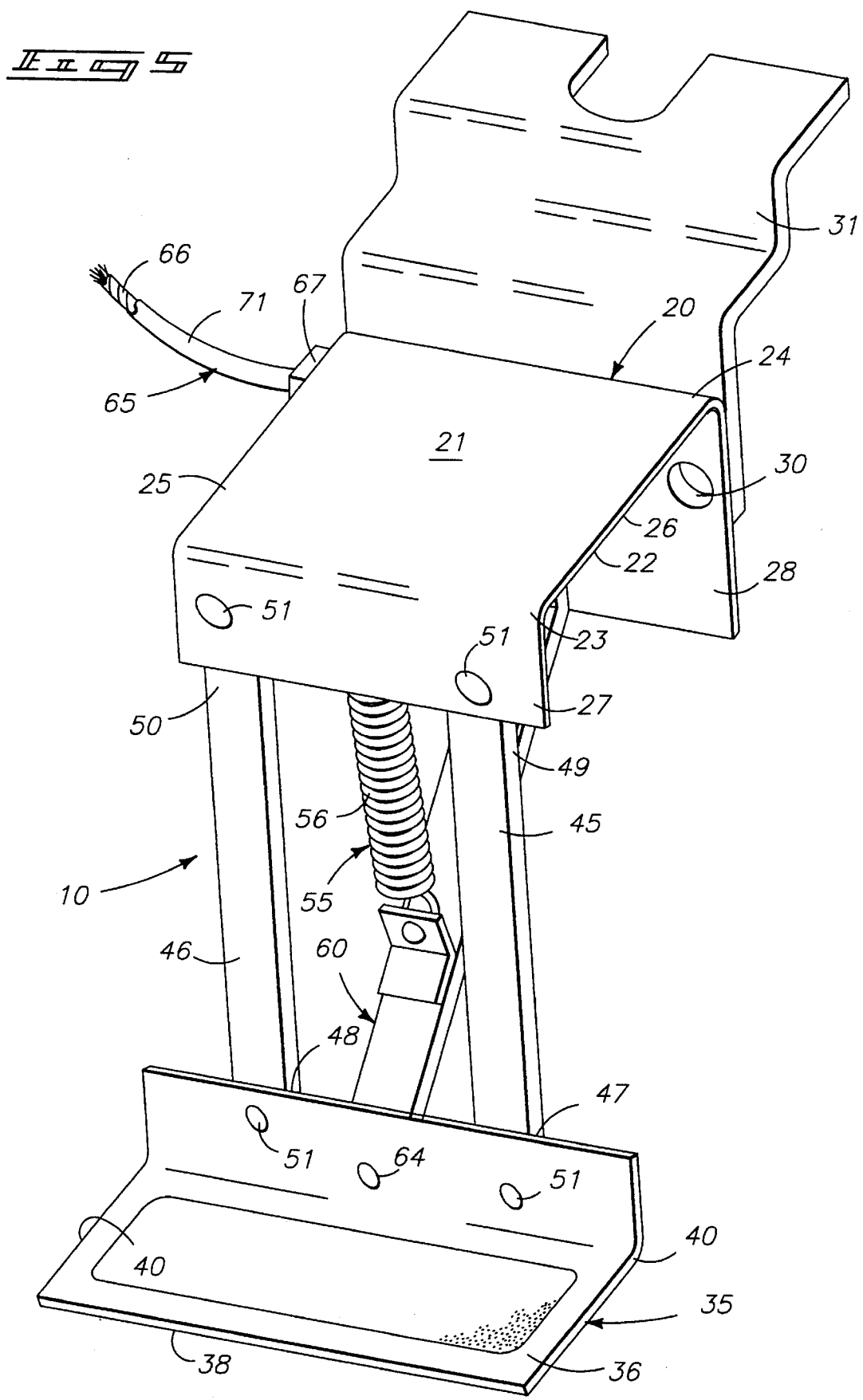

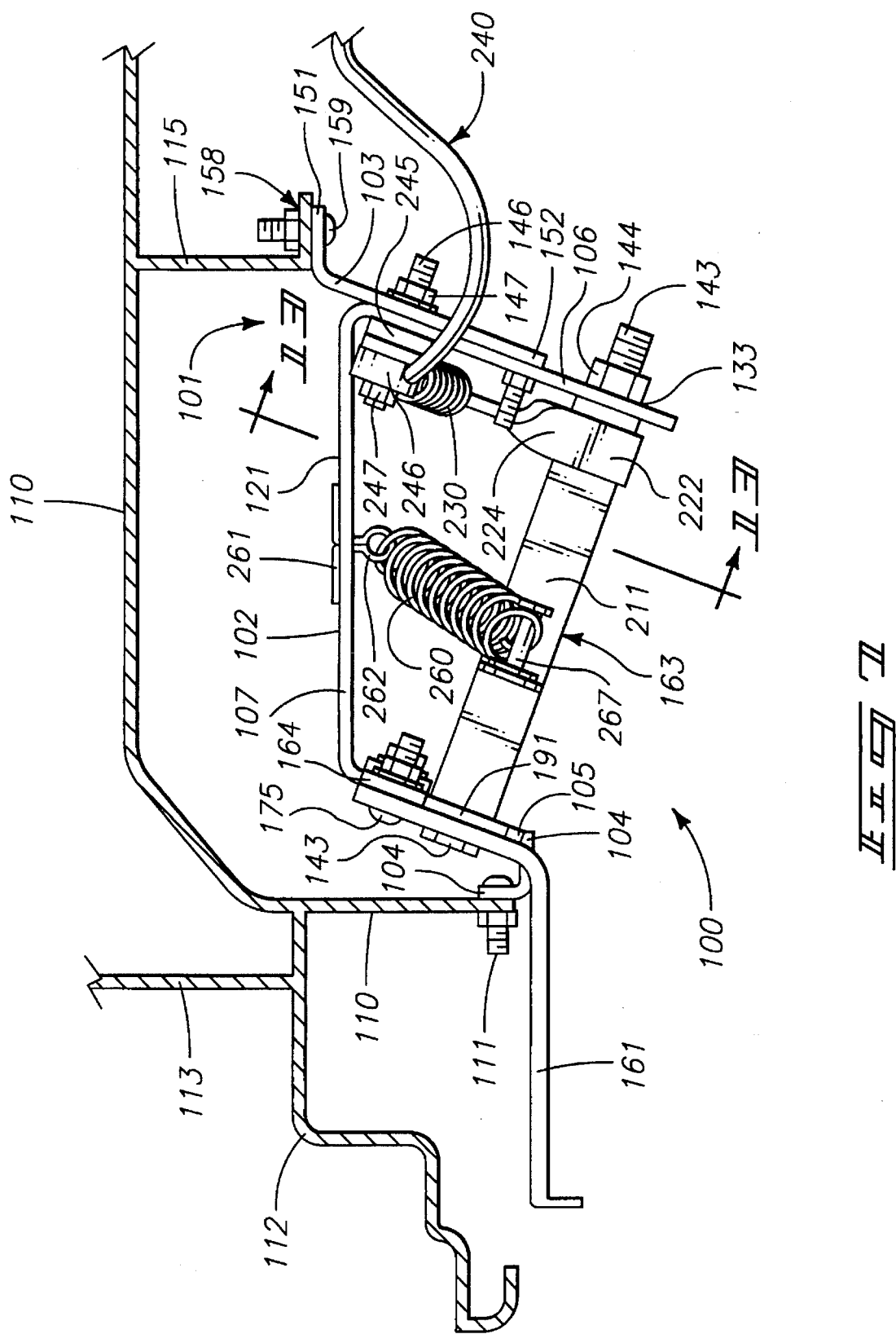

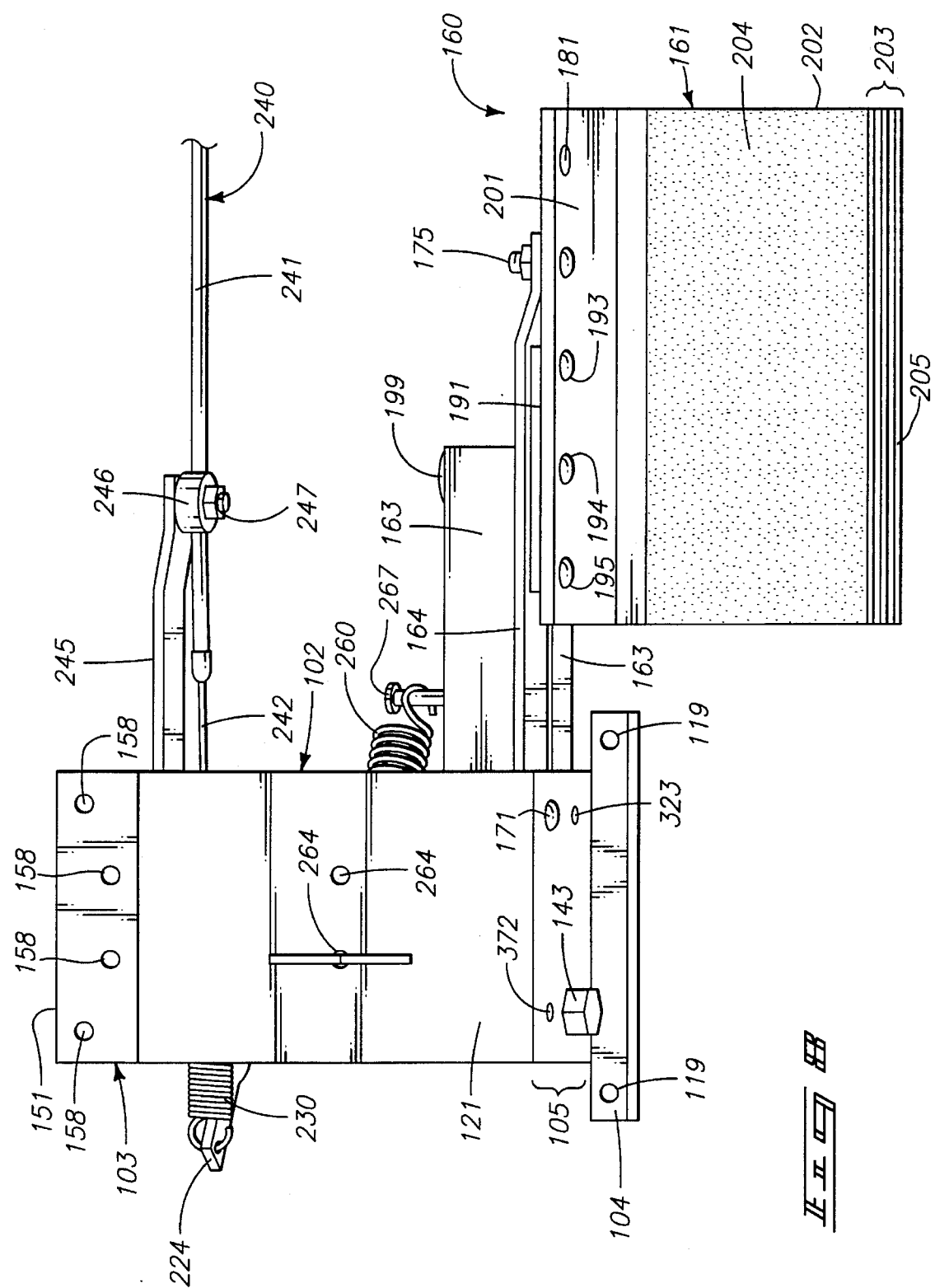

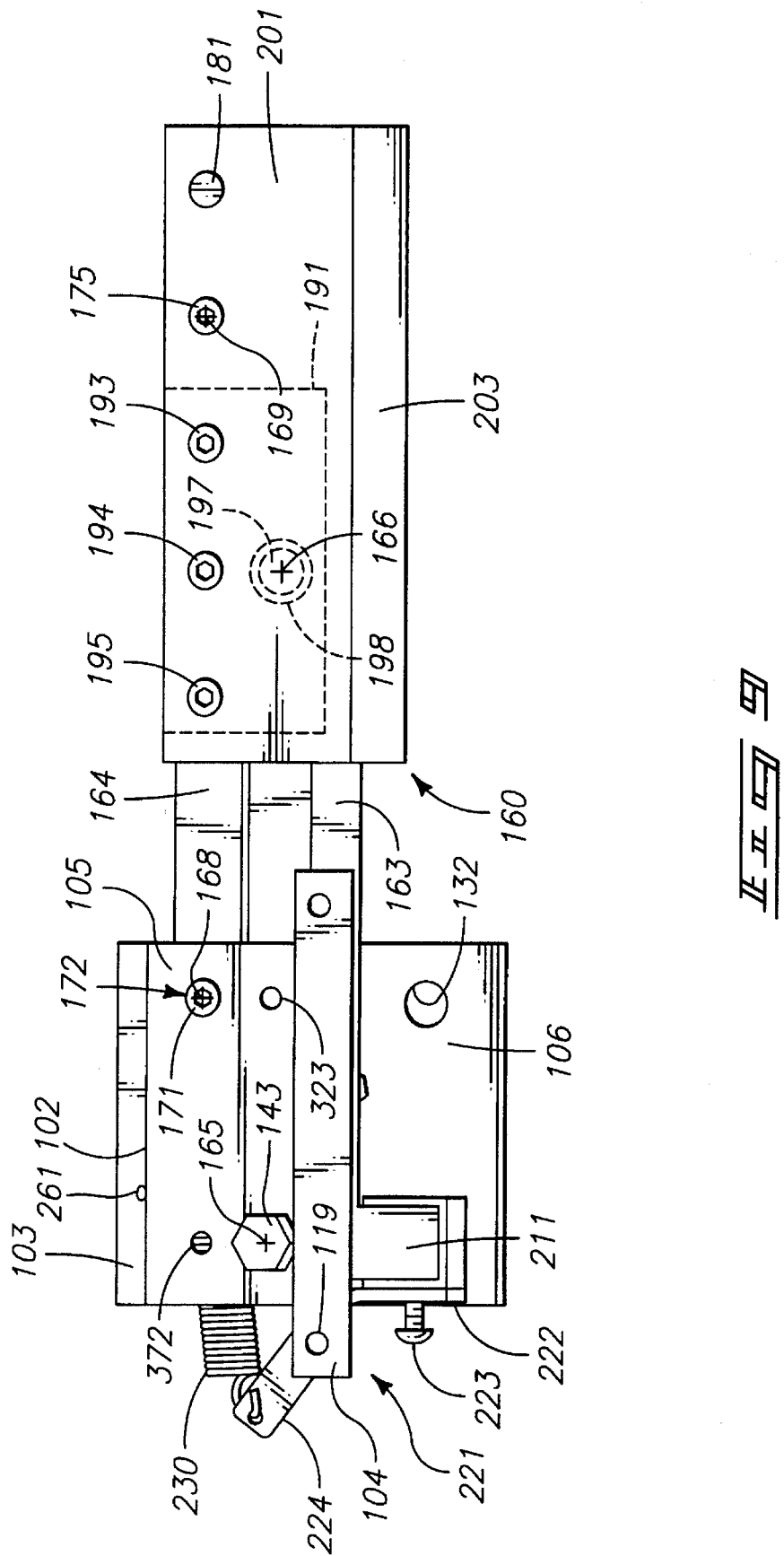

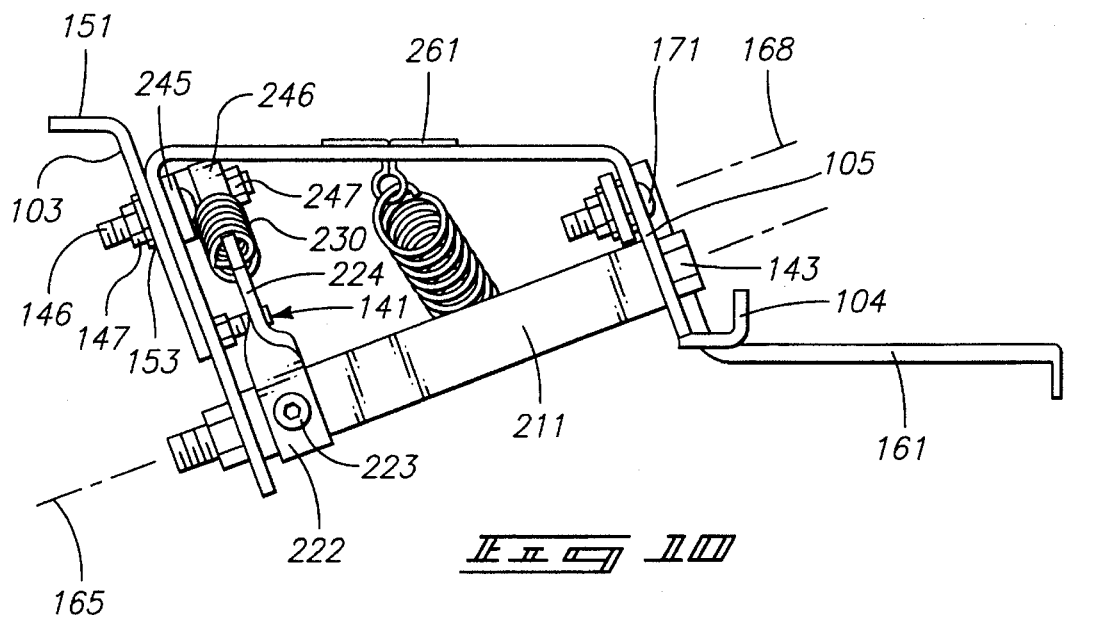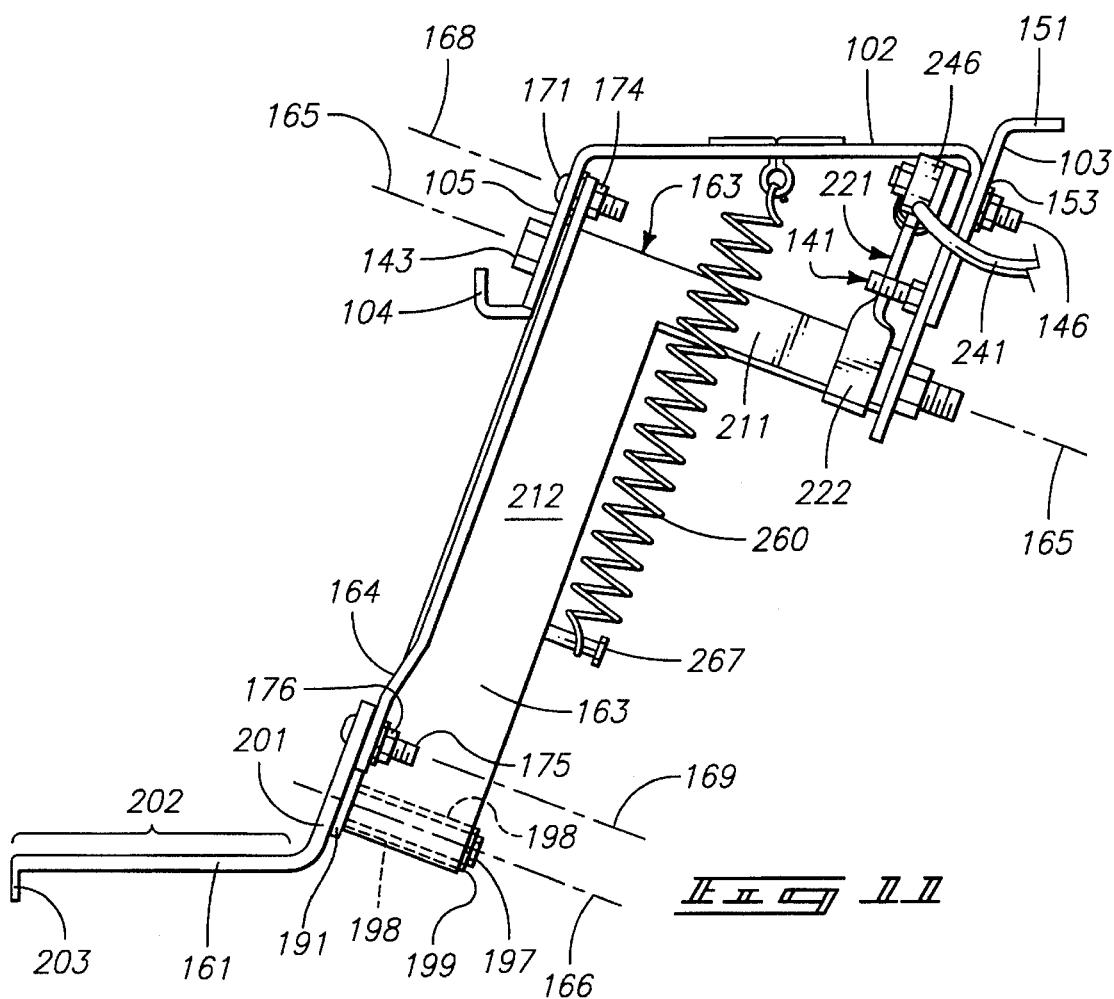

CONVERTIBLE VEHICLE STEP

CROSS-REFERENCE TO RELATED APPLICATION

This is a continuation-in-part of U.S. patent application Ser. No. 08/080,952 filed Jun. 21, 1993, U.S. Pat. No. 5,375,864.

TECHNICAL FIELD

The invention relates to folding steps mountable to vehicles.

BACKGROUND OF THE INVENTION

Many conventional and modified vehicles have elevated chassis. An example of such a vehicle are "off-road" four wheel drive vehicles in which the chassis and body are elevated substantially for ground clearance purposes. Such vehicles, and others having high chassis, are difficult to climb into.

As a solution to the access problem, fixed steps have been mounted to the vehicle body or chassis to provide lower step access to the vehicle passenger compartment. Provision of such fixed steps effectively lowers the elevation of the vehicle and therefore defeats the purpose in maximizing ground clearance.

It is known to provide folding steps, particularly for recreational vehicles. Such steps are typically rigid and are mounted to the recreational vehicle adjacent to a door. The steps will fold on a horizontal axis from an elevated storage position adjacent the door, to a lowered operative position. It is frequent that the steps fold upward into the swing path of the door in the inoperative, storage position. While this arrangement functions well to selectively alter the access elevation, the step apparatus is bulky and unsightly. This is especially true if such step configurations are to be used for primary occupant access doors in vehicles, such as four-wheel drive trucks, etc.

A need has therefore remained to provide a folding form of access step that will not effectively lower the working elevation of a vehicle, while functioning to provide easy access to the elevated vehicle. It is also desirable to obtain some form of folding access step arrangement that does not require special manipulations by the user to move between lowered, operative positions, and elevated, storage positions.

The present fold-down step accomplishes the above objectives by providing a step arrangement that is readily foldable from an elevated, storage position in which the step maintains a relatively compact profile under the vehicle and thereby does not interfere or effectively lower the ground clearance for the vehicle. The present fold-down step is also operative to move into an outwardly projecting, downward operative position providing easy foot access to support a user on entrance or egress to or from the adjacent vehicle. The present fold-down step also includes features that enable automatic operation of the fold-down step to move between the operative and inoperative positions responsive to opening and closing of the vehicle door. Preferred forms of the invention also provide convertibility so that configurations for driver and non-driver sides of the vehicle can easily be accommodated.

BRIEF DESCRIPTION OF THE DRAWINGS

Preferred embodiments of the invention are described below with reference to the accompanying drawings, which are briefly described below.

FIG. 5 is a perspective view similar to FIG. 4, only showing the step in an operative position.

FIG. 6 is an enlarged detail view of a cable safety release mechanism.

FIG. 7 is a side elevational view showing a further preferred embodiment of vehicle step according to this invention as seen in a retracted position. The view also shows portions of the vehicle in transverse cross-section.

FIG. 8 is a top view of the embodiment shown in FIG. 7.

FIG. 9 is a front elevational view of the embodiment of FIG. 7.

FIG. 10 is a side elevational view of the embodiment of FIG. 7 from the opposite side as compared to FIG. 7.

FIG. 11 is a side elevational view of the embodiment of FIG. 7 with the step assembly moved into an extended position.

DETAILED DESCRIPTION OF THE PREFERRED EMBODIMENTS

Figure 1:
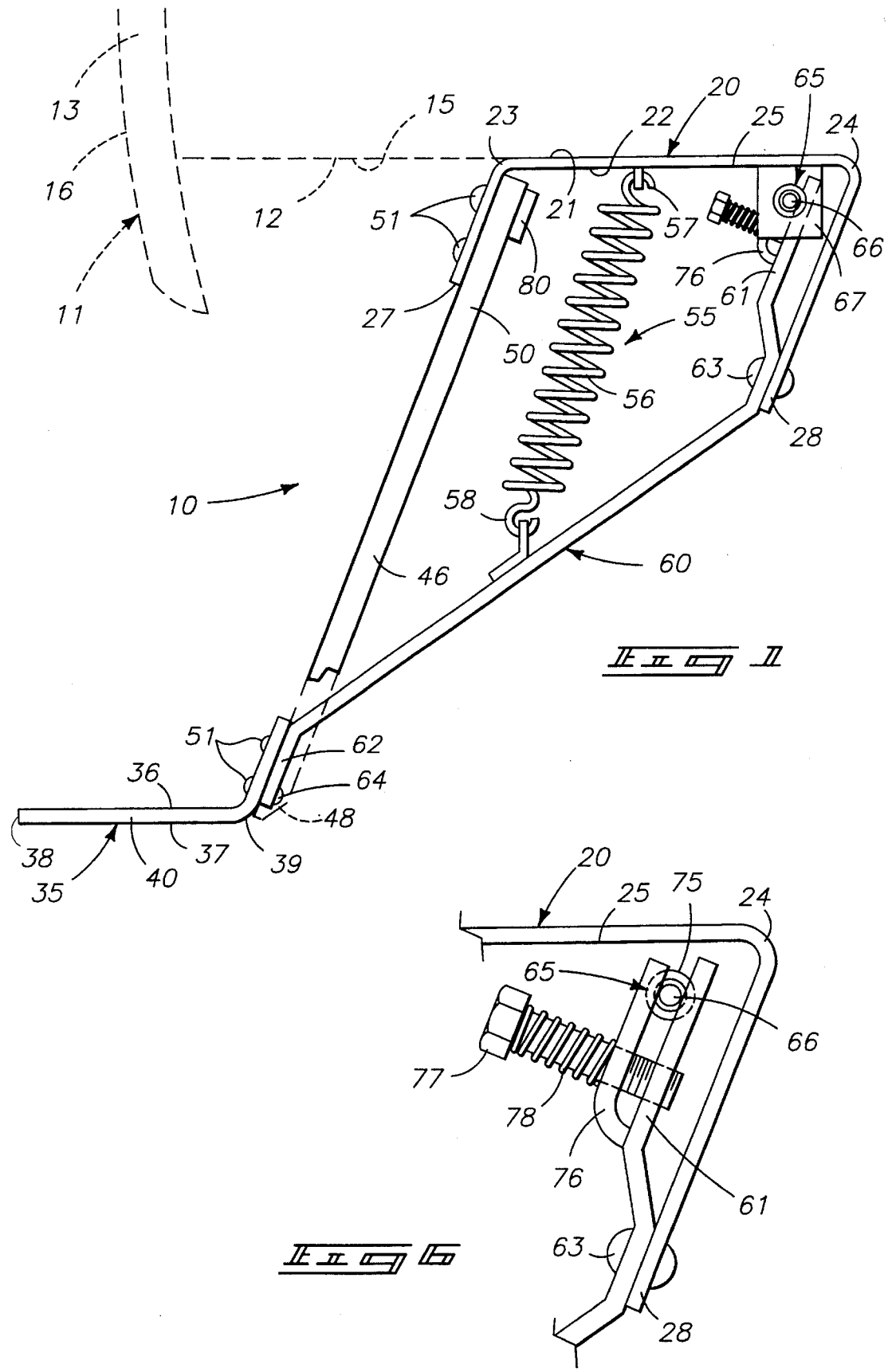
FIG. 1 is a side elevation view of the preferred present fold-down step, an associated vehicle being shown in broken lines.

This disclosure of the invention is submitted in furtherance of the constitutional purposes of the U.S. Patent Laws "to promote the progress of science and useful arts" (Article 1, Section 8).

A preferred form of the present fold-down step is illustrated in the drawings and is designated by the reference numeral 10. The preferred form of fold-down step 10 is for mounting to a vehicle 11 having a vehicle body or chassis 12 and a hinged door 13 (FIGS. 2, 3) mounted to the vehicle for movement between open and closed positions. A variety of vehicles may be used in conjunction with the present step 10. Most advantageous usage will be found with vehicles having elevated chassis where an intermediate elevation is desired to facilitate entrance or egress from the vehicle.

The present step 10 is mountable to the vehicle 11 at a select elevation, preferably on a horizontal undersurface 15 (FIG. 1) of the vehicle and inboard of an access door 13 and vehicle sidewall 16.

Figure 2:
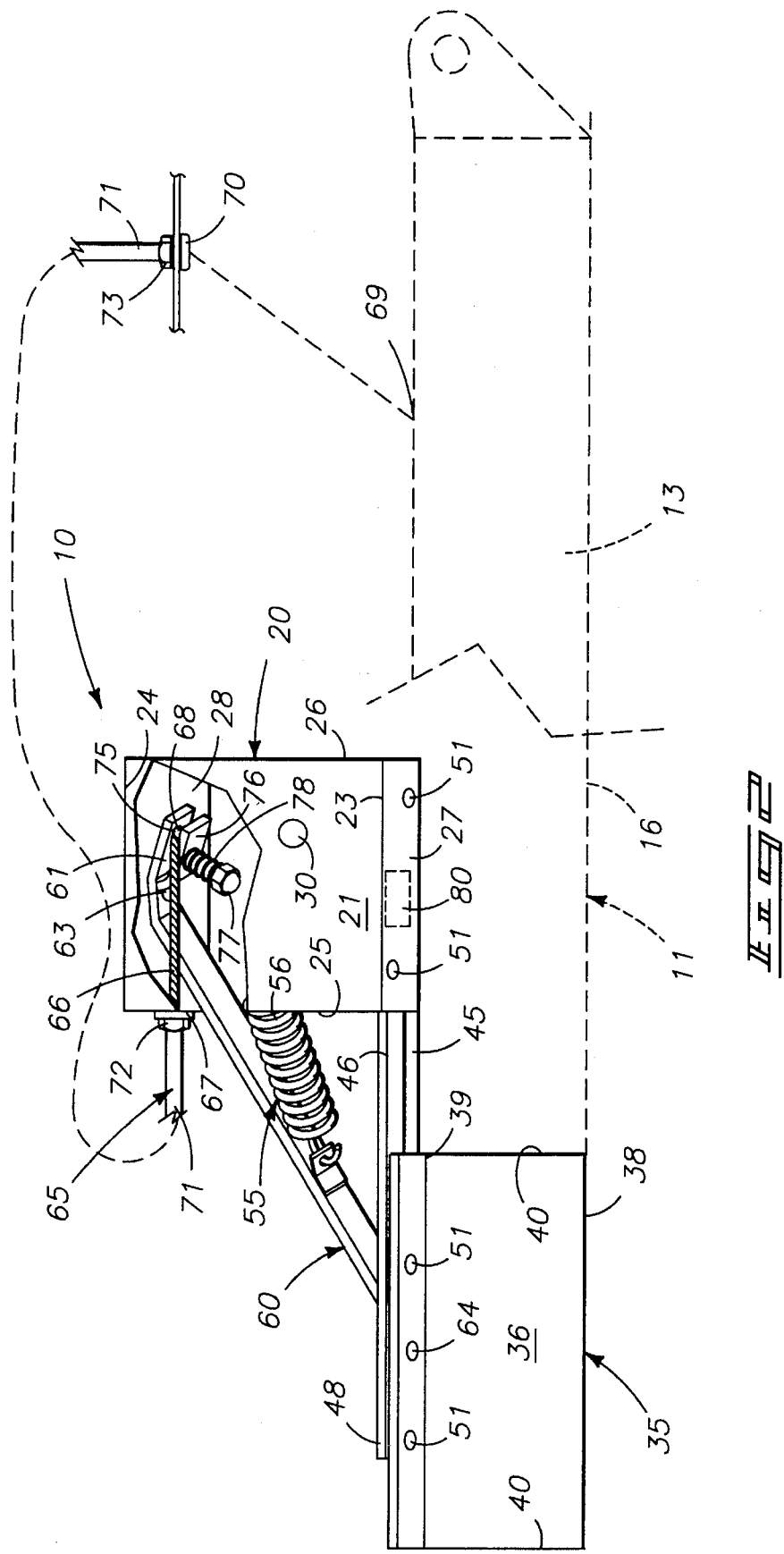
FIG. 2 is a diagrammatic view thereof, showing the inoperative storage condition of the fold-down step with an associated vehicle door in a closed position.
Figure 3:
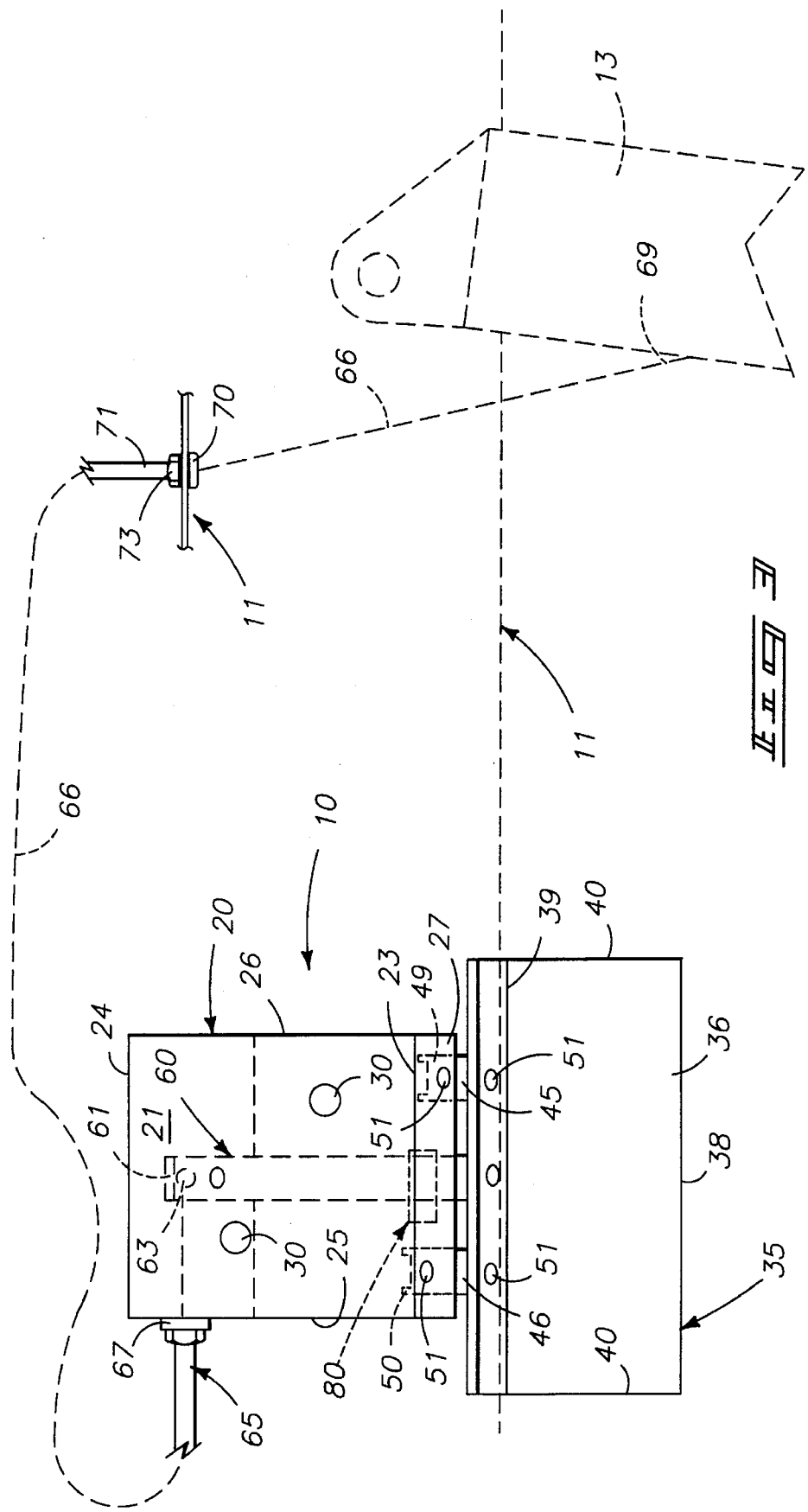
FIG. 3 is a diagrammatic view, enlarged from FIG. 2 only showing the operative position of the fold-down step with the associated vehicle door in an open position.
Figure 4:
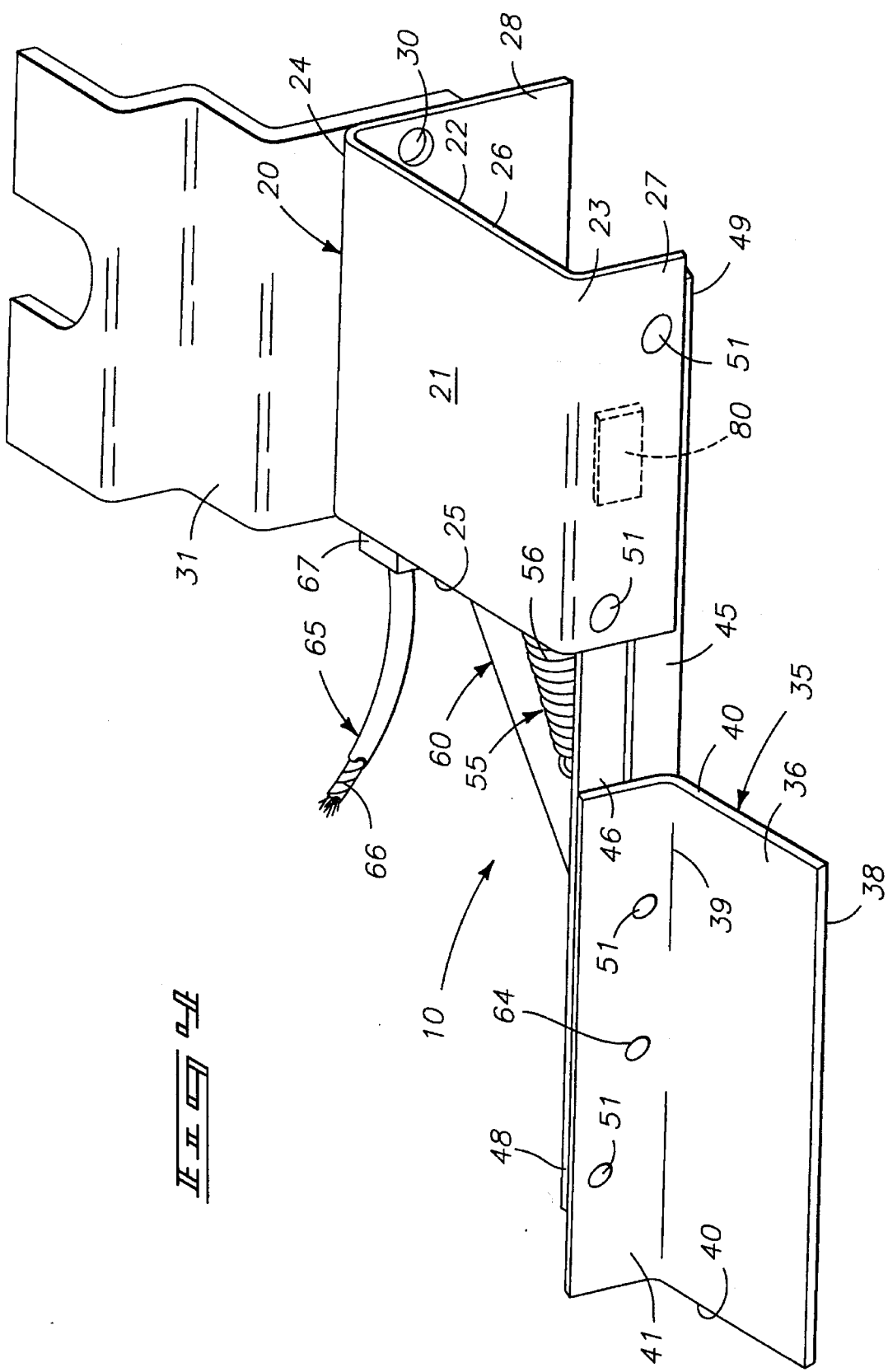
FIG. 4 is a perspective view of the present preferred fold-down step in the inoperative storage position.

The present preferred fold-down step folds, in response to closing and opening of the door 13, between a folded, compact storage position (FIGS. 2 and 4) and a down and outward projecting operative position (FIGS. 1, 3 and 5).

For purposes of further description and understanding of spatial relations herein, the term "inward" will relate to locations toward the midsection of the associated vehicle. "Outward" relates to locations away from the midsection of the associated vehicle. "Forward" relates to the front end of the associated vehicle, and "rearward" relates to the intended rearward end of the vehicle. Description of the present step will be given in the above terms, as if the step is mounted to the vehicle 11 at a location under the vehicle 11 and along the vehicle sidewall 16, below an access door 13. Thus the step will swing between an elevated rearward, inboard storage position (FIGS. 2 and 4) and a lowered, outward operative position (FIGS. 1, 3, and 5). The operative position is forward of the storage position.

It should be understood that the orientations related above are given by way of example simply to aid description of the invention and to provide a correlation between the present invention and a vehicle to which it may be mounted. Certainly the present invention could be mounted on the vehicle at a location other than the location exemplified herein.

The fold-down step 10 includes a mounting bracket 20 that is secured by means 30 for mounting the bracket 20 to the vehicle 11 along its undersurface 15 at the ground clearance elevation thereof. Means 30 is simply comprised of holes in the bracket for receiving standard fasteners such as screws or bolts. Adapter bracket configurations such as shown at 31 in FIGS. 4 and 5 may be utilized to mount the present step to various vehicles. The adapter shape and size may vary according to the vehicle and frame configuration.

The mounting bracket 20 includes a top surface 21 and a bottom surface 22 that are bounded by outward and inward mounting bracket edges 23, 24. The edges 23, 24 are joined by mounting bracket side edges 25, 26. The mounting bracket also includes angularly downward projecting outward and inward mounting flanges 27, 28 respectively for pivotally mounting the remainder of the fold-down step components. It is preferred that the top surface 21 when mounted on the vehicle, lies in the plane of the vehicle bottom surface 15. It is also preferable that the bracket be mounted to the vehicle with the outward mounting bracket flange 27 oriented just inward of the adjacent sidewall 16 or door jamb of the vehicle (FIG. 1) and with the inward mounting bracket edge 24 situated inboard from the outward edge 23. The outward and inward flanges 27, 28 will thus extend substantially longitudinally with respect to the longitudinal orientation of the vehicle. In other words, the outward flange 27 will face the vehicle sidewall 16 as shown in FIG. 2. The mounting bracket 20 and mounting means 30 are also provided such that the flanges 27, 28 face angularly upward when mounted on the vehicle.

A step plate 35 is provided in the preferred form, including top and bottom surfaces 36, 37 bounded by outward and inward step plate edges 38, 39. The edges 38, 39 are joined by step plate side edges 40. The actual configuration of the plate may vary. For example, the step plate could be substantially circular. The designation for outward, inward, and side edges is provided herein simply to aid the description of the step plate in relation to the mounting bracket, and the spatial relationship of the step plate to the bracket in operative and storage positions.

The step plate top surface 36 and the mounting bracket top surface 21 both lie preferably within substantially parallel planes. The angular relationships of these planes remain consistent (preferably parallel) regardless of the relative pivoted position of the step plate 35 between the elevated, storage position shown in FIGS. 2 and 4, and the lowered, operative position shown in FIGS. 1, 3, and 5. The consistent angular position of the step plate 35 is maintained by provision of at least one and preferably a pair of swing arms 45, 46 that form a parallelogram linkage between the mounting bracket 20 and step plate 35. The swing arms 45, 46 include lower first ends 47, 48 that are pivotally connected to the step plate 35, preferably along an upturned flange along the inward step plate edge 39.

The swing arms 45, 46 extend to second ends 49, 50 that are pivotally connected to the mounting bracket 20, in the plane of the outward flange 27 thereon. The opposed ends of the swing arms are mounted by pivot pins 51 to the flange 27 and step plate. The pivot axes are substantially parallel and are spaced apart to form a parallelogram. Thus, a parallelogram form of linkage is provided between the bracket 20 and step plate 35 such that the top surface 36 of the step plate will remain in an angular position relative to a horizontal plane (the undersurface of the vehicle being considered "horizontal"). This angular orientation with respect to the horizontal will remain constant throughout motion of the step plate between the upward, inoperative storage position and downward outwardly projecting operative position thereof. A stop 80 is provided on the bracket 20 in the downward path of the swing arm 46 to prevent substantial pivotal movement thereof beyond the operative position.

It may be noted from the figures that swing motion of the step plate between the operative and storage positions is influenced by the angular orientation of the pivot axes at the pivot pins 51. Thus, the step plate will swing downwardly and outwardly from the storage position to the operative position. The step, in the operative position, is thus presented for ease in user access as a step up to the vehicle. In the inoperative, storage position, the step plate 35 is shifted upwardly and inwardly to a compact inaccessible position adjacent the level of the vehicle undersurface 15. The planar top surface of the step plate is therefore substantially coplanar with the plane of the top mounting bracket top surface 21. Further, the outward edge portion 38 of the step plate is situated at an inboard spaced position with respect to the same edge when the step plate is situated in the operative position.

A retainer is generally shown at 55 for normally urging the step plate to one of the operative or inoperative positions. In a preferred form, the retainer is comprised of an elongated tension spring 56 secured at one end 57 to the mounting bracket 20 and at an opposite end 58 to a pivoted brace arm 60 which is operatively connected to the step plate 35. The spring 56 is positioned to normally urge the step plate in the preferred form toward the elevated, storage position.

The brace arm 60 is provided, pivotally connected between the inward flange 28 of the mounting bracket 20 and the inward step plate edge 39.

The brace arm 60 includes a top end 61 pivotally mounted at pin 63 to the rear flange 28 and a bottom end 62 pivotally mounted at pin 64 to the step plate between the swing arm lower first ends 47, 48. The pivot axes at the opposed ends of the brace arm 60 are parallel to one another and substantially parallel to the parallelogram pivot axes of the swing arms 45, 46.

As shown in FIG. 1, the brace arm forms a strong triangular brace configuration. The brace configuration is intended to provide strength, bolstering the swing arms against bending when weight is applied to the step plate 35 when at its operative position.

The upward or top end 61 of the brace arm 60 is provided for connection to a connector linkage 65. The linkage 65 is preferably comprised of a shielded cable 66 slidably mounted by a cable mounting bracket 67 to the rearward edge of the mounting bracket 20. A first end 68 (FIG. 2) of the cable is operatively mounted to the swing arms by way of the brace arm 60. A second cable end is mounted at a connection point 69 on the vehicle door 13.

A cable shield 71 includes a guide 72 surrounds the cable 66 and affixed at one end to the cable mounting bracket 67 to hold the cable in alignment with the upper end of the brace arm 60. The cable shield 71 then loops around the bracket 20, to where another fitting 73 at the opposite shield end is mounted to the vehicle. This end is provided with a cable guide 70 which is mounted to the vehicle adjacent the door jamb, between the door axis and the main step plate assembly.

The cable guide 70 may be mounted to the vehicle in order to guide and align the cable 66 properly with the fold-down step and a desired cable end connection point 69 on the door substantially as shown in FIGS. 2 and 3.

The cable 66 acts upon the brace arm 60 to pull the step plate down to its operative position as the door is opened. Subsequently the cable is pulled back by the spring 56, acting on the brace 60 to move the step plate to the storage position as the door is closed. Thus the door movement between open and closed positions will influence corresponding movement of step plate 35 in an arc between the storage and operative positions.

FIG. 6 illustrates a safety release mechanism for the cable 66, should the step brace and swing arms for some reason become bound and unable to swing forwardly. A ball 75 at the inward end of cable 66 is releasably held between the brace arm top end 61 and a clamp plate 76. The clamp plate 76 is biased against the ball by a spring 78. Pressure adjustment is provided by a bolt 77 that is threadably mounted to the brace arm top end 61 and received through a hole in the plate 76. The bolt may be turned to increase the compression of the spring in clamping force against the ball 75. Likewise, the bolt can be loosened to relax the compressive force of the spring and relax the gripping force against the ball. Such adjustment enables selective adjustment of the force required to hold the ball between the brace arm top end 61 and clamp plate 76. Thus, if the brace arm and swing arms bind for some reason, the user may simply push outwardly against the door, pulling the ball 75 from between the brace arm top end 61 and clamp plate 76. The adjustment described above is provided simply to selectively adjust the releasing force.

It is noted that the motion of the step plate is in an arc defined by the pivot axes of the brace and swing arms. The axes are angular with respect to the horizontal plane or ground plane in order to provide the advantages of: (1) allowing elevational arcuate movement of the plate between the downward operative position and the upward storage position; and (2) allowing inward and outward motion of the plate between the inward storage position where the step plate is situated inward of the vehicle side wall, and the outward operative position where the plate projects outwardly to facilitate foot access.

The present invention is constructed of rigid metal plate and channel, connected by rigid metal pins to provide adequate support for usage by adult humans. It is conceivable, however, that the fold-down step be constructed of heavier gauge materials to facilitate use for purposes other than supporting the weight of the human. Selection of materials and thickness thereof is derived using standard engineering practices.

Mounting of the present folding step is simply accomplished by securing the mounting bracket 20 at an appropriate position on the undersurface 15 of the vehicle and in the vicinity of the vehicle doorway. The mounting means, to this end, may utilize several sheet metal screws, bolts, or other appropriate fasteners that will securely clamp the mounting bracket 20 to the vehicle. Care is taken to mount the step assembly such that the step plate 35 is situated in an unobtrusive location when in the storage position, and is exposed for use when in the operative position.

The connector linkage 65 including the shield 71, cable guide 70, and end fittings 72, 73 are next mounted to the bracket 20 and the door 13. One fitting 72 is connected to the bracket 67 on the mounting bracket 20, and the other fitting 73 is secured by an appropriate conventional fastener to the vehicle in a position thereon to shield and guide the cable toward the desired position for the guide 70.

The guide 70 is mounted to the vehicle between the mounting bracket 20 and door hinge. Here, the guide 70 will guide motion of the cable 66 from the end secured to the vehicle door 13 and the opposed end 68 connected to the top end 61 of the brace arm 60. The arrangement is such that the door, when opened, will pull the cable. The cable 66 in turn will force the brace arm 60, swing arms 45, 46, and step plate 35 to swing downwardly from the storage position to the operative position against the pull of the spring 56. The position of the cable on the door is arranged so that when the door is full open, the step plate 35 will correspondingly reach its full downward operative position, hitting the stop 80, which keeps the step from going substantially past center. Likewise, as the door is closed, the cable will allow the retainer spring 56 to draw the step plate backward and up to its full retracted storage position.

Preferably, the step plate, when in the inoperative, storage position, is situated rearwardly of the mounting bracket (with respect to the forward end of the vehicle). This places the step plate behind the bracket 20 for protection during forward travel, and avoids binding between the step plate and any stationary objects that might be encountered as the associated vehicle moves forwardly.

FIGS. 7–13 show an alternative embodiment vehicle step assembly 100 further exemplifying inventive concepts according to this invention. Step assembly 100 includes a mounting assembly 101 having a first or main mount piece 102 and a mounting adapter 103.

Main mount piece 102 also preferably incorporates a side panel engagement piece 104 which allows a portion of the mounting assembly 101 to be secured to the bottom edge of the vehicle, such as at a bottom edge of a vehicle panel 110 using fasteners 111. As shown, piece 104 is an L-shaped angle piece having preformed holes 119 in both legs of the angle to facilitate mounting. FIG. 7 also shows an extension 112 which is connected to a vehicle side panel 113 under which the step is positioned when in the retracted position of FIG. 7.

Main mount piece 102 also preferably has an outer flange 105 and an inner flange 106. Flanges 105 and 106 are connected to a central part 107 and are preferably integrally formed therewith. Central part 107 has an upper surface 121 which is preferably oriented in a horizontal position relative to the horizontal surfaces of the pickup or other vehicle upon which the step is being mounted.

The inner flange 106 is preferably provided with a series of mounting holes which allow the adapter mounting piece 103 to be installed in different configurations to accommodate different vehicles and installation to either port or starboard sides of a particular vehicle. As shown best in FIG. 13, inner flange 106 is provided with six mounting holes 131–136. Central hole 131 mounts a stop 141. Stop 141 has a stop bolt 142 which is secured within hole 131 using a stop nut 140. Two lower mount holes 132 and 133 are available for mounting a pivot pin 143 in either of two configurations. Pivot pin 143 is held by a pivot pin nut 144.

Figure 13:
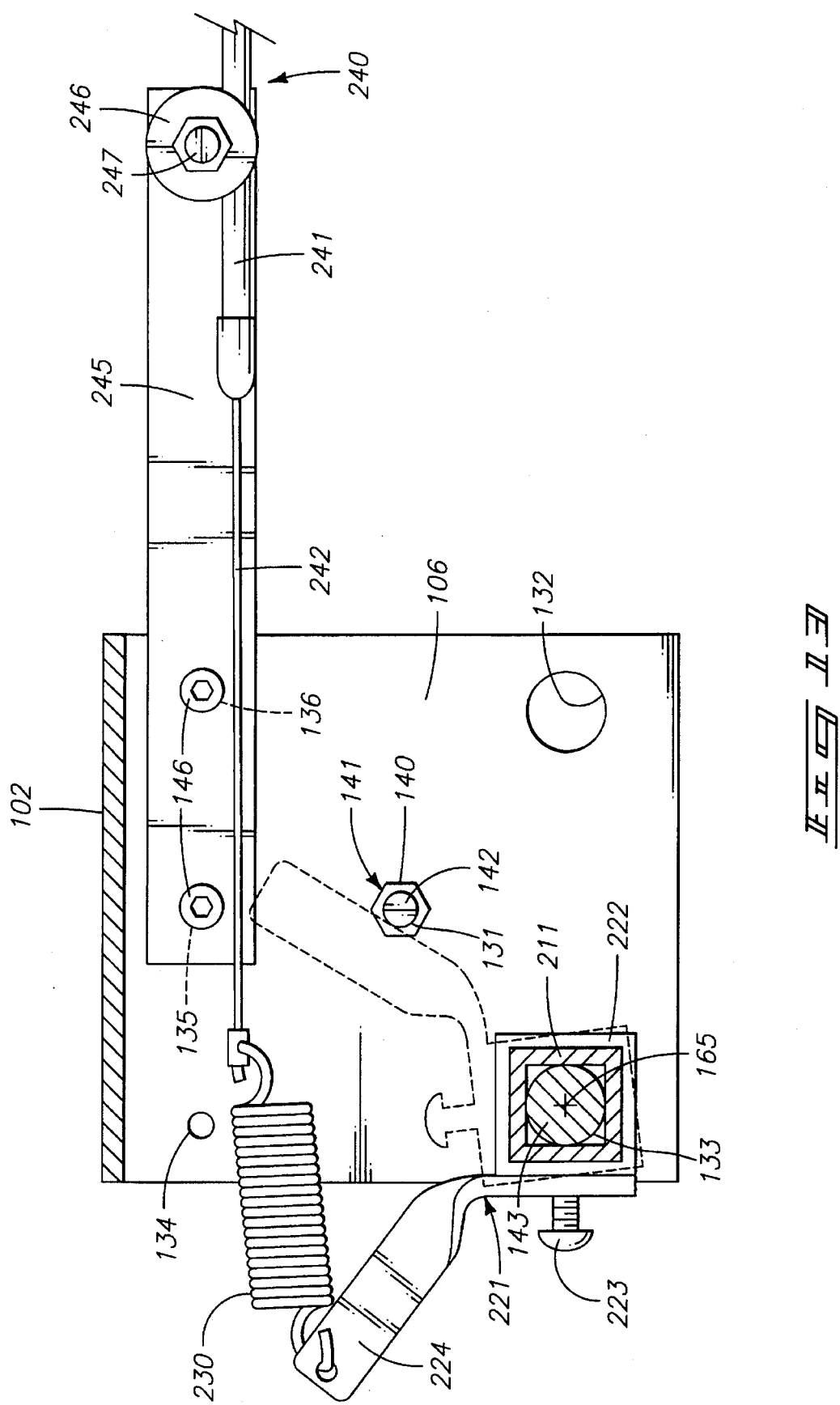
FIG. 13 is a view taken along line 13—13 of FIG. 7. Portions are shown in cross-sectional presentation.

Flange 106 also has three upper mounting holes 134–136. Mounting holes 134–136 are used to connect the main mount piece to mount adapter 103. As shown this is accomplished using the two adapter connection bolts 146 and associated nuts 147. Holes 135 and 136 are used in the configuration shown in FIG. 13. For the opposite side of the vehicle, holes 134 and 135 are used. In the opposite configuration the components of FIG. 13 are a mirror image of that shown.

Mounting adapter 103 has an upper flange 151 and a lower part 152. Lower part 152 is made with a number of mounting apertures 153 which are positioned so as to allow the mounting adapter to be configured for either side of a vehicle and to provide different heights for the upper flange 151 relative to the main mount piece 102. Alternative connection patterns and constructions are possible. Flange 151 is provided with four flange mounting holes 158 (FIG. 8) which receive mounting bolts 159 therethrough. Bolts 159 extend through apertures formed in a vehicle frame piece 115 and are secured with nuts.

Although the preferred mounting construction shown herein has particular advantages, it should be appreciated that alternative configurations are possible. In particular, the mounting adapter is intended to be specially configured dependent upon the type of vehicle.

Figure 12:
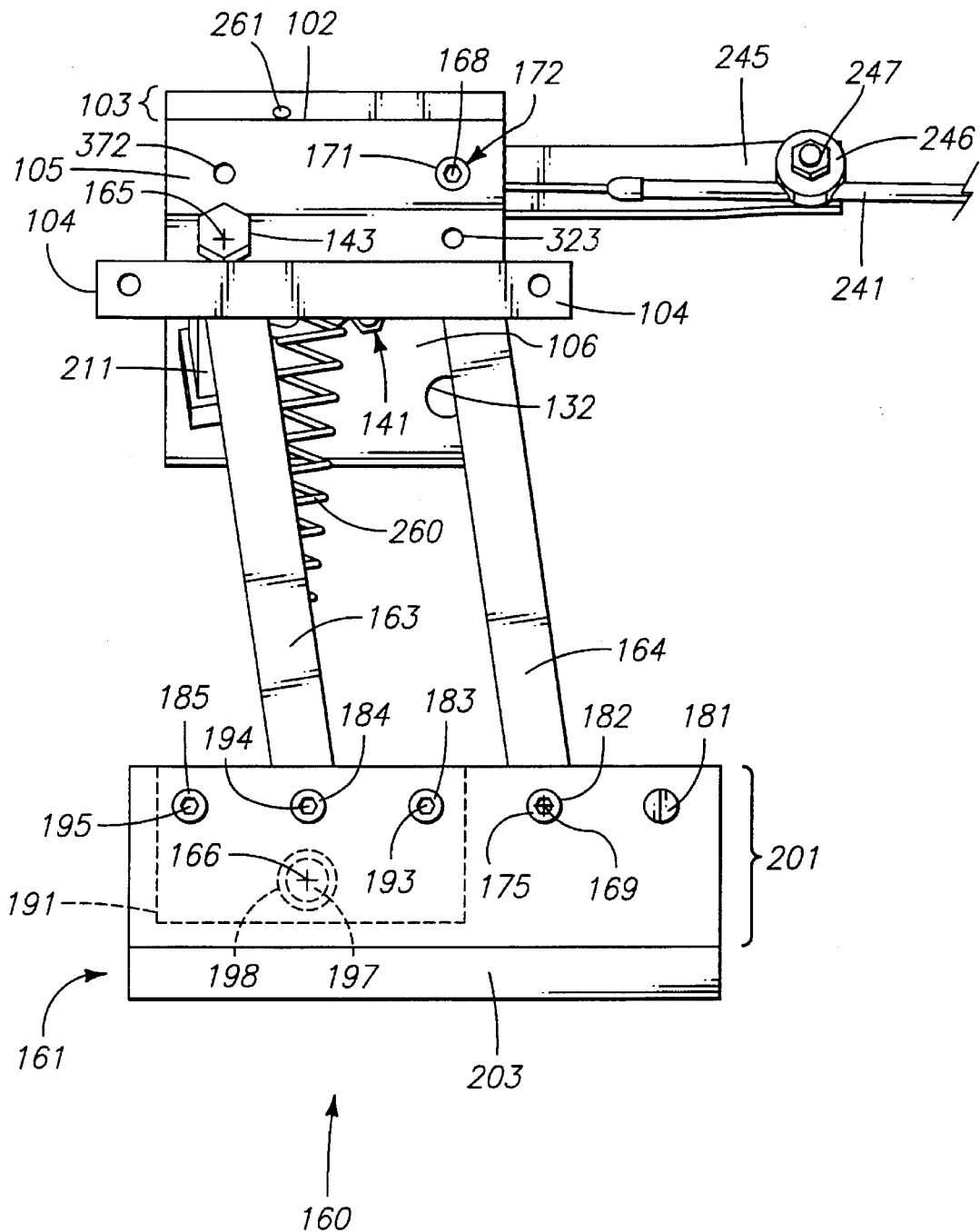
FIG. 12 is a front elevational view of the embodiment of FIG. 7 with the step assembly moved into an extended position.

Step assembly 100 also has an extendible subassembly 160. FIG. 12 shows that extendible subassembly 160 includes a step piece 161 and a connecting mechanism. Step connecting mechanism advantageously has a connecting link or links, such as first and second swing arms 163 and 164.

First swing arm 163 is pivotally connected to the mount so as to pivot about a first link upper end pivot axis 165. Upper or proximal end pivot axis 165 is defined by pivotal action of pivot pin 143 relative to the main mounting piece 102. First swing arm 163 is also pivotally connected to the step assembly near the distal or lower end of the swing arm.

The upper end of first swing arm 163 has a pivot tube 211 which receives the pivot pin 143 therethrough. Pivot tube 211 is sufficiently long to extend between the inner and outer flanges 106 and 105 of the mount. The pivot tube 211 is connected to a longitudinal portion 212 of swing arm 163. The longitudinal portion is preferably a rectangular tube providing good strength and relatively light weight. The first swing arm longitudinal portion 212 is integrally connected, such as by welding, or otherwise securely connected to the pivot tube 211 to provide a structural bracket. This construction provides a first swing arm which forms a cantilevered arm which carries the load applied when a person steps onto the step piece 161. The torque and mechanical reaction of the first swing arm is applied to the inner and outer flanges thus providing good structural capability. This cantilevered bracket construction and pivotal mounting of the first swing arm is made sufficiently strong to carry the cantilevered load of the outwardly extending step. This construction also allows the second link to be simplified and constructed as simply as the indicated bar which maintains a parallelogram linkage relationship between the step, mount and both swing arms.

The lower or distal end of the first swing arm is connected to the step assembly so as to provide pivotal action about pivot axis 166. The pivotal connection at axis 166 is advantageously formed using a first swing arm distal pivot connection piece 191. As shown, the connection piece 191 includes a connection plate which is secured to the extendible subassembly 160 using fasteners 193–195 which extend through apertures 183–185 formed in the upper part of the step piece 161. Fasteners 193–195 also extend through complementary apertures formed through connection piece 191. Connection piece 191 further includes a pivot shaft extension 197 which extends into and is pivotally connected to near the distal end of first swing arm 163. Pivot shaft extension 197 is advantageously supported in a bushing type bearing sleeve 198 and detachably secured therethrough using a snap-ring retainer 199.

The second swing arm link 164 is also pivotally connected to the mounting assembly 101 at the upper end, and to the step subassembly at the lower or distal end. An upper or proximate end second swing arm pivot axis 168 is defined by a pivot pin 171. Pivot pin 171 is advantageously a relatively short fastener which extends through a hole in the second swing arm and an upper mounting aperture 172 formed in the mount outer flange 105. The lower or distal end of second swing arm 164 has a pivot axis 169 defined by a pivot pin 175 which extends through an aperture 182 in the step piece 161. Pivot pin 175 also extends through an aperture formed through second link bar 164 near the distal end thereof. Pin 175 is advantageously secured using a nut 176. Pivot pins 171 and 175 are advantageously accompanied by suitable interpositioned washers (not numbered).

The step forming a part of extendible subassembly 160 includes a step piece 161, connection piece 191, and associated fasteners. Main step connection pivot piece 191 was described above. Step piece 161 is most preferably formed as an integral part having an inside or upper flange 201 (FIG. 12), a tread portion 202 (FIG. 11), and an outer reinforcing flange or lip 203. Tread portion 202 is advantageously constructed with an anti-slip tread panel or covering 204 (FIG. 8). Outer reinforcing lip 203 advantageously constructed with outer tread grooves 205. Anti-slip tread panel 204 can be made using an adhesively applied cover strip or by suitably treating the surface of the tread portion 202.

The mount 101, step piece 161 and swing arms 163 and 164 form a parallelogram four bar movable linkage. This construction keeps the tread of the step at an orientation parallel to the upper surface 121 of main mount piece 102. Thus tread 202 is oriented at a fixed orientation relative to the vehicle, preferably in an orientation parallel to floorboard surfaces of the vehicle.

FIG. 11 shows that pivot axes 165, 166, 168 and 169 are inclined relative to the upper surface 121 of the main mount piece, which is typically horizontal. This inclination is preferably in the range of approximately 15°–30° of arc from horizontal. The desired inclination is more preferably in the range of 20°–25° of arc from horizontal. The inclination determines the required angular orientation of the mounting flanges 105 and 106 and the specific locations of the associated pivot receiving apertures 133, 172, and the aperture through which pin 143 is shown extending at outer flange 105. Additional holes 372, 373 in outer flange 105 are provided for complementary mounting of the swing arms 163, 164 on the opposite side of the vehicle. The inclined orientation of the swing arm pivot axes causes the swing arm distal ends and connected step to move downwardly and outwardly from the retracted position of FIG. 7 to the extended position of FIG. 11.

The pivot axes 168 and 169 of the second swing arm are positioned at relatively higher positions than the corresponding axes 165 and 166 of the first swing arm. These pivot axes also define corners of a parallelogram. The higher position of the second swing arm pivots allows the two swing arms to come nearly together in a side-by-side relationship when in the retracted position, such as in FIG. 9. The step is cantilevered from the front or outside surfaces of the swing arms so that greater retraction of the step up under the vehicle is possible. This coupled with cantilevered mounting and arrangement of the L-shaped bracket first swing arm 163 provides superior construction which has excellent stability and good load handling strength with convenient retraction and extension movements and positioning.

The step assembly further includes a suitable extension and retraction operator. As shown in FIG. 13, the operator is advantageously a cable operator 240. Cable operator 240 includes a cable shield 241 surrounding a cable 242. The cable 242 has a first end which is connected to operate the extendible subassembly 160. The second remote end of the cable 242 is connected to be actuated by the vehicle door in a construction the same or similar to that described hereinabove. The cable operator 240 has its first end secured, preferably to the mounting 101. As shown, this is advantageously accomplished using a cable end mounting extension 245 which is connected to the inner flange 106 of the main mount piece 102. Piece 245 is preferably connected using the same fasteners 146 as are used to hold the mount adapter 103 to the main mounting piece 102. The cable end mounting extension has a cable holder 246 which clamps the cable shield 241 as adjusted using a detachable fastener 247. This provides a cable shield mounting which is adjustable and detachable for improved installation, adjustment and maintenance.

The cable operator 240 is connected in operable relationship to the extendible subassembly 160. This is advantageously accomplished using a pivot tube crank 221 which transmits torque to the first swing arm 163 via the square or otherwise appropriately shaped pivot tube 211. Pivot tube crank 221 includes a pivot tube crank base 222. Base 222 has a receiving aperture through which the pivot tube extends and preferably mates in a manner which allows torque to be transmitted. The crank base is further secured to the pivot tube at a suitable position using a pivot tube crank set screw 223. The crank base is connected to a crank lever arm 224 which extends outwardly from the pivot axis 165. The pivot tube is pivoted upon pin 143 by applying a force to crank lever arm 224. This is advantageously done by pulling upon crank lever arm 224 using the cable operator 240 or other suitable operator.

Operator 240 is preferably connected to lever arm 224 using a tension spring 230. Tension spring 230 serves as both a connection for the cable end and as a safety release mechanism which allows the vehicle door to be opened even though the extension assembly 160 is stuck, jammed or otherwise cannot be deployed into an extended position. Safety release spring 230 functions by merely extending when the force exceeds a typical range needed to operate the extendible subassembly 160. The spring is chosen to have sufficient elastic elongation travel so that normal vehicle door operation is possible without overextending the spring. Thus the spring is capable of automatically returning to normal operation once the extendible subassembly is freed from its stuck condition, such as by clearing away accumulations of dirt.

The step assembly also preferably includes the stop mechanism 141 mounted in hole 131 of the inner flange 106, for limiting the travel of the swing arms to the desired fully extended position. The preferred extension stop mechanism employs the pivot tube crank 221. Crank lever arm 224 pivots into the extended position shown in phantom in FIG. 13 to bear against stop 141.

The step assembly 100 also preferably includes a biasing member such as return biasing spring 260. Biasing spring 260 is preferably mounted using a movable spring hanger which, as shown, is in the form of a cotter pin 261 having a spring support eye 262. This construction allows spring 260 to be suspended from either of two spring mounting holes 264 (FIG. 8) formed through the central section 107 of the main mount piece. As shown in FIG. 8, the spring is hung from the left hole 264. When the unit is mounted on the opposite side of the vehicle the spring is hung from the other hole 264. The opposite or downward end of extension subassembly biasing spring 260 is pivotally connected to the extendible subassembly, such as at spring connection stud 267 which extends from first swing arm 163.

At this point further explanation will be made as to how the step assembly 100 is assembled and configured for mounting from either side of a vehicle. FIGS. 7–15 show the construction when mounted upon an American driver's side (port side) of a vehicle. When used upon an American passenger side (starboard side) the first swing arm main pivot pin 143 is installed in hole 323 (FIG. 8) and a corresponding hole 132 in the inward flange 106. The reconfigured second swing arm pivot pin 171 is alternatively installed in hole 372. The first swing arm thus is again mounted toward the front of the vehicle, and the second swing arm is mounted toward the rear of the vehicle. The return spring is mounted in a complementary fashion as explained above. The cable operator and pivot tube crank are also reversed. The five mounting holes 181–185 allow the connection piece 191 to be installed toward the front of the step piece 161. The rearward hole is left open or fitted with a plug.

Figure 14:
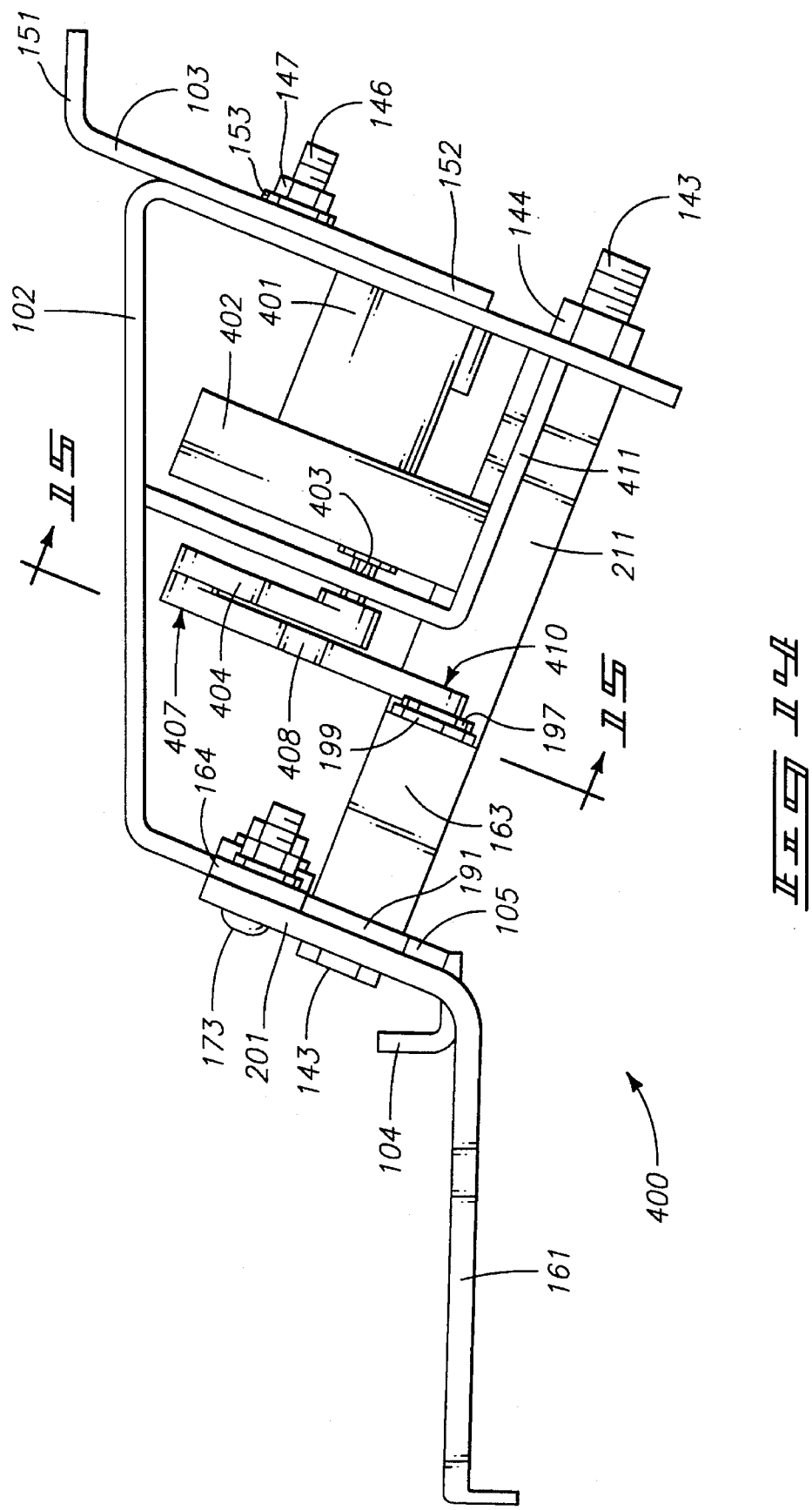
FIG. 14 is a side view of an alternative step assembly according to this invention.
Figure 15:
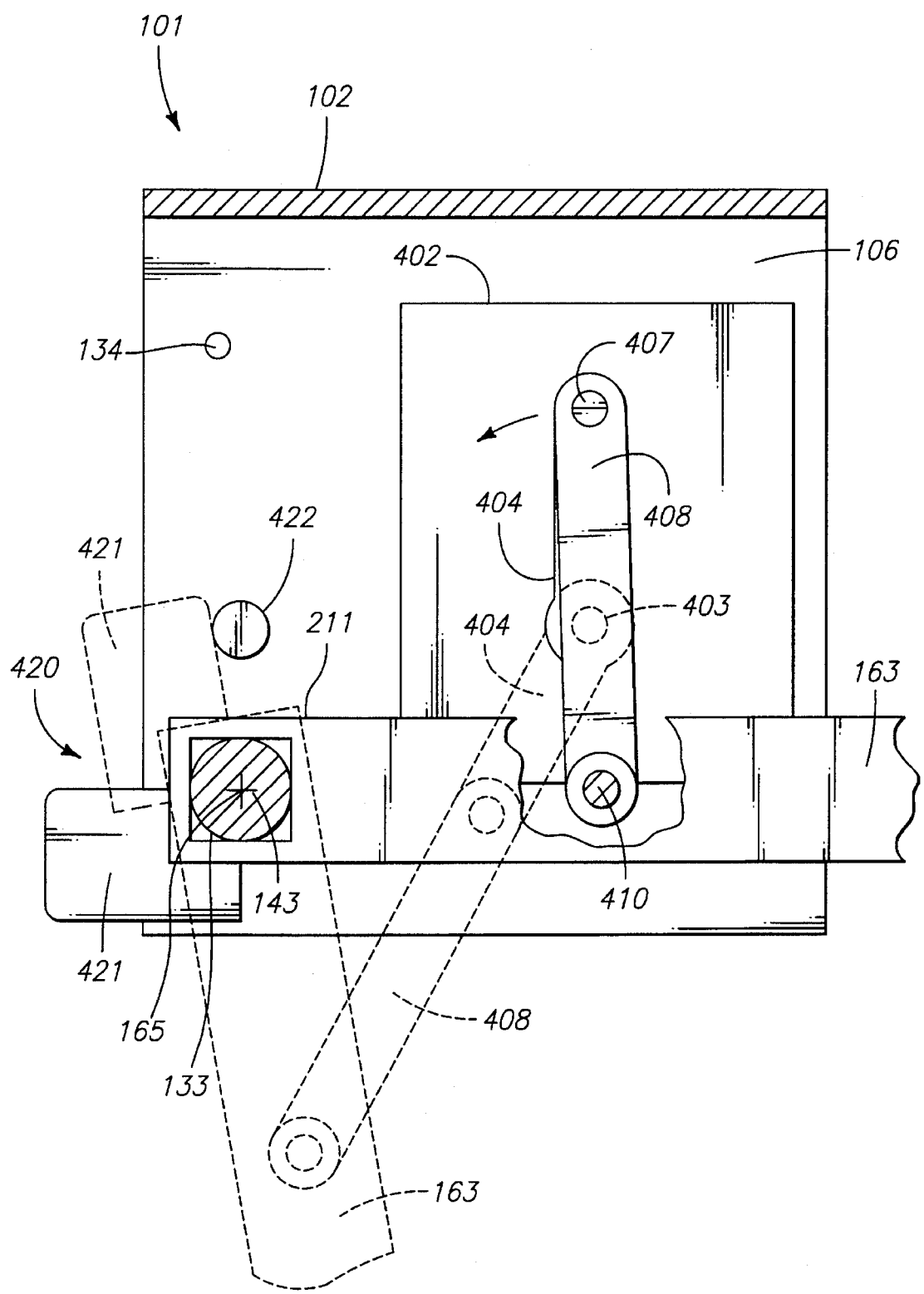
FIG. 15 is a view taken along line 15—15 of FIG. 14.

FIGS. 14 and 15 show a further preferred embodiment step assembly 400 according to the invention wherein the cable operator has been replaced with a motor operator and certain limited modifications are made. Similar parts will not be described again and are identified with the same reference numerals as used in step assembly 100.

Operator motor 401 is mounted upon the mounting assembly using a motor mount bracket 411. Motor 401 has an output drive transmission 402 with an output shaft 403. Output shaft 403 is connected to transmit torque through a drive output crank 404. The distal end of crank 404 is pivotally connected to connecting bar 408 at pivot 407. The opposite end of bar 408 is pivotally connected to first swing arm 163 at pivot stub 410. Stud 410 is connected at a fixed position along the inside of first swing arm 163. Motor 401 is controlled to move the extendible subassembly into an extended position, such as by using a switch (not shown) mounted in the door opening of the vehicle which indicates the vehicle door is open. When the vehicle door is closed the switch senses such and the motor automatically returns the extendible subassembly to the retracted position.

The motor operated embodiment 400 also preferably includes a stop mechanism 420 for stopping the extendible subassembly in a desired fully extended position. The stop mechanism 420 includes a stop extension 421 which is at a fixed angular position on the pivot tube 211. In the extended position shown in phantom in FIG. 15, stop extension 421 rotates to bear against a stop member 422 fastened to the mount main piece 102.

The step assemblies described herein are preferably constructed of steel or aluminum formed into appropriate shapes as described or consistent with the explanations given herein. In the preferred forms the step piece 161 is aluminum and remaining parts are steel coated to resist corrosion.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A step assembly for a vehicle, the vehicle having an actuating mechanism for actuating movement of the step assembly between an extended position and a retracted position, the retracted position being located below the lateral underside of the vehicle, the step assembly comprising:
   a. a step;
   b. a mounting bracket including means suitable for rigidly attaching the mounting bracket to the underside of the vehicle, the means being capable of assembly;
   c. at least one swing arm pivotably connected at one end to the mounting bracket and pivotably connected at the other end to the step, to permit the step to be lowered and raised between the extended position and the retracted position, the pivotable connections of the at least one swing arm to the mounting bracket and to the step being capable of assembly;
   the pivotable connection of the at least one swing arm to the mounting bracket having an axis of rotation defining a swing path for the at least one swing arm and the step, the swing path having a generally longitudinal direction relative to the vehicle;
   the pivotable connection of the at least one swing arm to the step for positioning the step substantially flush with the lateral underside of the vehicle when the step assembly is in its retracted position;
   d. an extension and retraction operator connected to the step assembly and to the actuating mechanism, the operator having first means for responding to the actuating mechanism and having second means for causing the step to travel between the extended position and the retracted position; and
   e. multiple complementary mounting apertures in the step assembly for allowing the step assembly to be attached to either the port side or the starboard side of the vehicle, the multiple complementary mounting apertures positioned to cause the step to travel from the extended position to the retracted position in the same longitudinal direction relative to the vehicle when the step assembly is attached to the starboard side of the vehicle, as when the step assembly is attached to the port side of the vehicle.

2. A step assembly according to claim 1, wherein the extension and retraction operator is comprised of a motor operator.

3. A step assembly according to claim 1, wherein the extension and retraction operator is comprised of a sheathed cable operator.

4. A step assembly according to claim 3, further comprising a safety release mechanism for releasing the extension and retraction operator should the step or the at least one swing arm become inoperative.

5. A step assembly according to claim 1, further comprising a load carrying brace attached between the at least one swing arm and one of the mounting bracket and the vehicle, the load carrying brace for supporting the step assembly by distributing loads imposed on the step to other portions of one of the mounting bracket and the vehicle.

6. A step assembly according to claim 1, further comprising a stopping mechanism for prohibiting the step assembly from swinging in a direction opposite the longitudinal direction of the swing path.

7. A step assembly according to claim 1, further comprising a retainer for continually urging the step in the retracted position.

8. A step assembly for a vehicle, the vehicle having an actuating mechanism for actuating movement of the step assembly between an extended position and a retracted position, the retracted position being located below the lateral underside of the vehicle, the step assembly comprising:
   a. a step;
   b. a mounting bracket including means suitable for rigidly attaching the mounting bracket to the underside of the vehicle, the means being capable of assembly;
   c. at least two swing arms each pivotably connected at one end to the mounting bracket and pivotably connected at the other end to the step, to permit the step to be lowered and raised between the extended position and the retracted position, the pivotable connections of the at least two swing arms to the mounting bracket and to the step being capable of assembly;
   wherein the pivotable connection of each of the at least two swing arms to the mounting bracket includes an axis of rotation defining a swing path for the at least two swing arms and the step, the axis of rotation being oriented substantially normal to the longitudinal axis of the vehicle along a line inclined upwardly from the horizontal in the outwardly direction of the vehicle;
   whereby the step is caused to move longitudinally, vertically, and horizontally relative to the vehicle when traveling between the retracted position and the extended position;
   the pivotable connections of the at least two swing arms to the mounting bracket and to the step being placed such that, in the retracted position, the pivotable connections of the at least two swing arms to the step are located past the furthest pivotable connections of the at least two swing arms to the mounting bracket with respect to the longitudinal direction of the swing path relative to the vehicle;
   d. an extension and retraction operator connected to the step assembly and to the actuating mechanism, the operator having first means for responding to the actuating mechanism and having second means for causing the step to travel between the extended position and the retracted position; and
   e. multiple complementary mounting apertures in the step assembly for allowing the step assembly to be attached to either the port side or the starboard side of the vehicle, the multiple complementary mounting apertures positioned to cause the step to travel from the extended position to the retracted position in the same longitudinal direction relative to the vehicle when the step assembly is attached to the starboard side of the vehicle, as when the step assembly is attached to the port side of the vehicle.

9. A step assembly according to claim 8, wherein the extension and retraction operator is comprised of a motor operator.

10. A step assembly according to claim 8, wherein the extension and retraction operator is comprised of a sheathed cable operator.

11. A step assembly according to claim 10, further comprising a safety release mechanism for releasing the extension and retraction operator should the step or at least one of the at least two swing arms become inoperative.

12. A step assembly according to claim 8, further comprising a load carrying brace attached between at least one of the at least two swing arms and at least one of the mounting bracket and the vehicle, the load carrying brace for supporting the step assembly by distributing loads imposed on the step to other portions of at least one of the mounting bracket and the vehicle.

13. A step assembly according to claim 8, further comprising a stopping mechanism for prohibiting the step assembly from swinging in a direction opposite the longitudinal direction of the swing path.

14. A step assembly according to claim 8, further comprising a retainer for continually urging the step in the retracted position.

* * * * *